US012731867B2

(12) United States Patent
Shin et al.

(10) Patent No.: US 12,731,867 B2
(45) Date of Patent: Sep. 8, 2026

(54) NONAQUEOUS ELECTROLYTE SECONDARY BATTERY SEPARATOR, NONAQUEOUS ELECTROLYTE SECONDARY BATTERY MEMBER, AND NONAQUEOUS ELECTROLYTE SECONDARY BATTERY

(71) Applicant: Sumitomo Chemical Company, Limited, Tokyo (JP)

(72) Inventors: Akihiko Shin, Niihama (JP); Yuki Yoneguchi, Niihama (JP)

(73) Assignee: SSLM CO., LTD., Daegu (KR)

( * ) Notice: Subject to any disclaimer, the term of this patent is extended or adjusted under 35 U.S.C. 154(b) by 472 days.

(21) Appl. No.: 18/385,144

(22) Filed: Oct. 30, 2023

(65) Prior Publication Data

US 2024/0332743 A1 Oct. 3, 2024

(30) Foreign Application Priority Data

Mar. 31, 2023 (JP) ................................ 2023-059117

(51) Int. Cl.

| | |
|---|---|
| ***H01M 50/417*** | (2021.01) |
| ***H01M 10/052*** | (2010.01) |
| ***H01M 10/0525*** | (2010.01) |
| ***H01M 50/414*** | (2021.01) |
| ***H01M 50/423*** | (2021.01) |
| ***H01M 50/449*** | (2021.01) |

(Continued)

(52) U.S. Cl.

CPC ....... *H01M 50/489* (2021.01); *H01M 10/052* (2013.01); *H01M 10/0525* (2013.01); *H01M 50/414* (2021.01); *H01M 50/417* (2021.01); *H01M 50/423* (2021.01); *H01M 50/449* (2021.01); *H01M 50/461* (2021.01); *H01M 50/491* (2021.01); *Y02E 60/10* (2013.01)

(58) Field of Classification Search

CPC .................... H01M 10/052; H01M 50/40–497

See application file for complete search history.

(56) References Cited

U.S. PATENT DOCUMENTS

2021/0135178 A1* 5/2021 Matsuo .............. H01M 50/417

FOREIGN PATENT DOCUMENTS

JP H11130900 A 5/1999

OTHER PUBLICATIONS

Dendrite-separator interactions in lithium-based batteries, Jana et al (Year: 2015).*

* cited by examiner

*Primary Examiner* — Allison Bourke
*Assistant Examiner* — Louise James Iannucci
(74) *Attorney, Agent, or Firm* — Panitch Schwarze Belisario & Nadel LLP

(57) ABSTRACT

Provided is a nonaqueous electrolyte secondary battery separator capable of satisfactorily maintaining ion permeability even after being compressed. The nonaqueous electrolyte secondary battery separator includes a polyolefin porous film in which an average of inclination angles of major axes of voids extracted from a two-dimensional image of a cross section of the polyolefin porous film is not less than 7.0, the inclination angles being calculated from respective circumscribed rectangles of the voids, the two-dimensional image being obtained by use of SEM, and the cross section being formed by cutting the polyolefin porous film (i) along a straight line that passes a center of a surface of the polyolefin porous film and is parallel to an MD or a TD and (ii) in a direction perpendicular to the surface.

7 Claims, 1 Drawing Sheet

(51) Int. Cl.

| | |
|---|---|
| ***H01M 50/46*** | (2021.01) |
| ***H01M 50/489*** | (2021.01) |
| ***H01M 50/491*** | (2021.01) |

Dfx

Dfy

S

VOID

CIRCUMSCRIBED RECTANGLE

L

NONAQUEOUS ELECTROLYTE SECONDARY BATTERY SEPARATOR, NONAQUEOUS ELECTROLYTE SECONDARY BATTERY MEMBER, AND NONAQUEOUS ELECTROLYTE SECONDARY BATTERY

This Nonprovisional application claims priority under 35 U.S.C. § 119 on Patent Application No. 2023-059117 filed in Japan on Mar. 31, 2023, the entire contents of which are hereby incorporated by reference.

TECHNICAL FIELD

The present invention relates to a separator for a nonaqueous electrolyte secondary battery (hereinafter referred to as a "nonaqueous electrolyte secondary battery separator"), a member for a nonaqueous electrolyte secondary battery (hereinafter referred to as a "nonaqueous electrolyte secondary battery member"), and a nonaqueous electrolyte secondary battery.

BACKGROUND ART

Nonaqueous electrolyte secondary batteries such as a lithium secondary battery are currently in wide use as (i) batteries for devices such as a personal computer, a mobile telephone, and a portable information terminal or (ii) on-vehicle batteries.

As a separator for use in such a nonaqueous electrolyte secondary battery, a porous film containing polyolefin as a main component is mainly used. Examples of the porous film containing polyolefin as a main component encompass a porous film produced by the method disclosed in Patent Literature 1, which includes a step of stretching a resin composition containing a polyolefin-based resin.

CITATION LIST

Patent Literature

[Patent Literature 1]
Japanese Patent Application Publication Tokukaihei No. 11-130900

SUMMARY OF INVENTION

Technical Problem

In recent years, development of high-capacity batteries has been ongoing for use in applications such as an electric vehicle (EV) with a greater cruising range. As an example of the high-capacity battery, a nonaqueous electrolyte secondary battery including a silicon electrode as a negative electrode has been developed. However, it is known that, as compared with a conventional negative electrode, a negative electrode (such as a silicon electrode) in a high-capacity battery expands in charging and discharging, so that a volume of the negative electrode changes by, for example, approximately 4 times. As a result, in the high-capacity battery, an internal pressure inside the battery (cell) is further increased. Due to the increase in internal pressure, the high-capacity battery has the following problem that the separator is compressed in charging and discharging, and this leads to blocking of a void (hole) inside the separator, and this results in a decrease in permeability of ions that are charge carriers.

In order to solve the problem, an object of an aspect of the present invention is to provide a nonaqueous electrolyte secondary battery separator that is capable of satisfactorily maintaining ion permeability even after being compressed.

Solution to Problem

As a result of diligent studies, the inventors of the present invention have arrived at the present invention based on finding that a nonaqueous electrolyte secondary battery separator including a polyolefin porous film in which an inclination of a void in a cross section falls within a specific range can satisfactorily maintain ion permeability even after being compressed.

An aspect of the present invention is a nonaqueous electrolyte secondary battery separator including a polyolefin porous film, an average of inclination angles of major axes of voids extracted from a two-dimensional image of a cross section of the polyolefin porous film being not less than 7.0°, the inclination angles being calculated from respective circumscribed rectangles of the voids, the two-dimensional image being obtained by use of a scanning electron microscope, and the cross section being formed by cutting the polyolefin porous film (i) along a straight line that passes a center of a surface of the polyolefin porous film and is parallel to an MD or a TD and (ii) in a direction perpendicular to the surface.

Advantageous Effects of Invention

The nonaqueous electrolyte secondary battery separator in accordance with an aspect of the present invention brings about an effect of being capable of satisfactorily maintaining ion permeability even after being compressed.

DESCRIPTION OF EMBODIMENTS

Figures 1, 2:
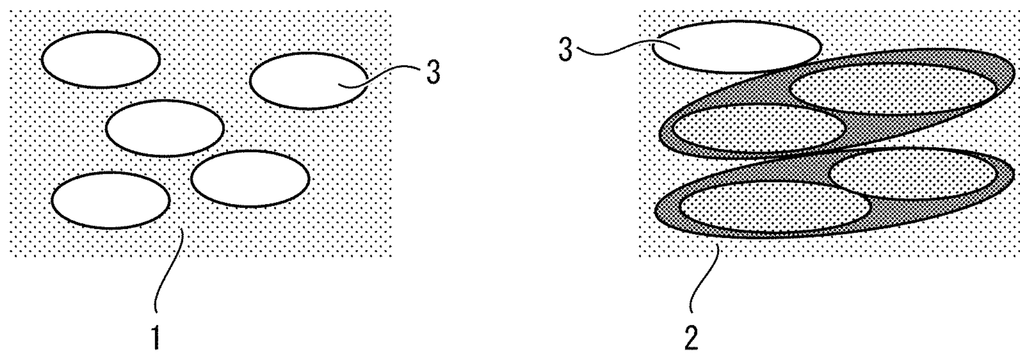
FIG. 1 is a schematic diagram illustrating a void part inside a polyolefin porous film that constitutes a nonaqueous electrolyte secondary battery separator in accordance with an aspect of the present invention and a circumscribed rectangle of the void part.
FIG. 2 is a schematic diagram illustrating (i) an aspect of a void 3 inside a polyolefin porous film 1 in which a polyolefin-based resin has a lower crystal orientation degree in an MD or a TD and (ii) an aspect of a void 3 inside a polyolefin porous film 2 in which a polyolefin-based resin has a higher crystal orientation degree in the MD or the TD.

The following description will discuss embodiments of the present invention. Note, however, that the present invention is not limited to these embodiments. The present invention is not limited to arrangements described below, but may be altered in various ways by a skilled person within the scope of the claims. The present invention also encompasses, in its technical scope, any embodiment derived by combining technical means disclosed in differing embodiments. Any numerical range expressed as "A to B" herein means "not less than A and not more than B" unless otherwise stated.

Herein, the term "machine direction" (MD) refers to a direction in which a polyolefin resin composition in sheet form and a porous film are transferred in a method of producing a porous film (described later). The term "transverse direction" (TD) refers to a direction which is (i)

perpendicular to the MD and (ii) parallel to a surface of the polyolefin resin composition in sheet form and a surface of the porous film.

If a production method is unknown, that is, a direction in which the polyolefin resin composition in sheet form and the porous film which are raw materials are transferred is unknown, the MD of the nonaqueous electrolyte secondary battery separator and the porous film that constitutes the nonaqueous electrolyte secondary battery separator refers to a longitudinal direction (cylindrical type: a winding direction, continuous fanfold type: a folding-back direction) of the film. The TD in the nonaqueous electrolyte secondary battery separator and the porous film refers to a direction which is (i) parallel to a surface of the nonaqueous electrolyte secondary battery separator and a surface of the porous film and (ii) perpendicular to the MD.

Embodiment 1: Nonaqueous Electrolyte Secondary Battery Separator

A nonaqueous electrolyte secondary battery separator in accordance with Embodiment 1 of the present invention includes a polyolefin porous film, an average of inclination angles of major axes of voids extracted from a two-dimensional image of a cross section of the polyolefin porous film being not less than 7.0°, the inclination angles being calculated from respective circumscribed rectangles of the voids, the two-dimensional image being obtained by use of a scanning electron microscope, and the cross section being formed by cutting the polyolefin porous film (i) along a straight line that passes a center of a surface of the polyolefin porous film and is parallel to an MD or a TD and (ii) in a direction perpendicular to the surface.

The nonaqueous electrolyte secondary battery separator in accordance with an embodiment of the present invention includes a polyolefin porous film. Hereinafter, the polyolefin porous film may be referred to simply as a "porous film". Hereinafter, the nonaqueous electrolyte secondary battery separator may be referred to simply as "separator".

The separator in accordance with an embodiment of the present invention can be a separator that is constituted by the porous film. The separator in accordance with an embodiment of the present invention can be a separator that is a laminate including the porous film and an insulating porous layer (described later). Hereinafter, a separator that is a laminate including the porous film and the insulating porous layer (described later) may also be referred to as a "laminated separator". The separator in accordance with an embodiment of the present invention can, as necessary, include a publicly known porous layer other than the insulating porous layer, such as a heat-resistant layer, an adhesive layer, and/or a protective layer as described later.

In an embodiment of the present invention, the average inclination angle is calculated as follows. First, the porous film is cut in a direction perpendicular to a surface of the porous film along a straight line that passes a center of the surface of the porous film and is parallel to the MD or the TD, and thus a cross section is formed. A two-dimensional image of the formed cross section is obtained by use of a scanning electron microscope (SEM), and a circumscribed rectangle of a void extracted from the two-dimensional image is prepared. For each of all voids included in the two-dimensional image, an inclination angle of a major axis is calculated from the circumscribed rectangle. The calculated inclination angles are averaged, and thus an average inclination angle is obtained. Hereinafter, the inclination angle of the major axis may be referred to simply as "inclination angle". The circumscribed rectangle is a rectangle inside of which comes into contact with the void.

Specifically, for example, the average inclination angle is calculated by a method including the following steps (1) through (12):

(1) The porous film is cut in a direction perpendicular to a surface of the porous film along a straight line that passes a center of the surface of the porous film and is parallel to the MD or the TD, and thus a cross section is formed.

(2) A deposited film for SEM observation is formed on the cross section formed in the step (1).

(3) For the cross section on which the deposited film has been formed in the step (2), a reflection electron image is observed under conditions in which an acceleration voltage is 0.8 kV and an operating distance is 3.0 mm, using SEM. Thus, an SEM image of the cross section (thickness direction: 960 pixels×MD or TD: 1280 pixels) is obtained.

(4) From the cross-sectional SEM image obtained in the step (3), an analysis region having a size of 100 pixels (thickness direction)×1280 pixels (MD or TD) is extracted. At this time, the analysis region is extracted so that the analysis region includes the entire cross-sectional region of the porous film. In the analysis region, an x-coordinate (x-axis) is taken in the MD or TD and a y-coordinate (y-axis) is taken in the thickness direction.

(5) With respect to the analysis region, a process of normalizing a luminance value is carried out.

(6) With respect to the analysis region which has been subjected to the luminance value normalization process and obtained in the step (5), a luminance inversion process is carried out in order to accurately identify a void part when carrying out binarization described below.

(7) With respect to the analysis region which has been subjected to the luminance inversion process and obtained in the step (6), binarization is carried out.

(8) With respect to the analysis region which has been subjected to the binarization and obtained in the step (7), a blob process is carried out, and thus a void part is identified and extracted. Specifically, an area of a blob constituting each void part identified by the blob process is calculated using the number of pixels, and a blob having an area of not less than 10 pixels is extracted as a void part. In the subsequent processes, the extracted void part is treated as a void part, and a void part which is constituted by a blob having an area of smaller than 10 pixels is not treated as a void part.

(9) For each void part extracted in the step (8), a circumscribed rectangle as illustrated in FIG. 1 is created. Here, FIG. 1 is a schematic diagram illustrating a void part inside a polyolefin porous film that constitutes the separator in accordance with an aspect of the present invention and a circumscribed rectangle of the void part. In FIG. 1, the void part is indicated as a "void". The circumscribed rectangle is a rectangle inside of which comes into contact with the void part.

(10) For each of circumscribed rectangles created from respective void parts in the step (9), among the 4 vertices, a vertex having the smallest x-coordinate is considered to be P1, and the other vertices are considered to be P2, P3, and P4 in a counterclockwise direction from P1. Next, for each of the circumscribed rectangles, a straight line that connects P1 to P2 is considered to be L12, and a straight line that connects P1 to P4 is considered to be L14. Then, a straight line that is longer one of the lines L12 and L14 is considered to be a major axis.

(11) For each of the circumscribed rectangles, an angle formed between the major axis and the x-axis is calculated, and the calculated value is considered as an inclination angle θ of each void part. Here, calculation is carried out with the following condition: $0° < θ < 90°$.

(12) An average of the respective inclination angles θ of all void parts calculated in the step (11) is calculated. The average thus calculated is considered as an average inclination angle.

In the step (1), the porous film may be replaced with a laminated separator that includes, in addition to the porous film, another layer such as an insulating porous layer. In such a case, as shown in the step (4), extraction of the analysis region is carried out so that the analysis region includes the entire cross-sectional region of the porous film, which is a base material of the laminated separator. In other words, a cross-sectional region of the another layer does not need to be included in the analysis region.

In the step (1), a method of cutting the porous film is not limited to a particular one, and a publicly known method can be employed. The cutting method can be, for example, an ion milling method. If the laminated separator is cut in the step (1), a cutting method identical with that in the case of cutting the porous film can be employed.

In the step (2), the deposited film may be a typical deposited film that can be used in observation of a reflection electron image using SEM. The deposited film may be, for example, a deposited film constituted by osmium. The deposited film can be formed by a publicly known method.

A magnification of the SEM when obtaining the SEM image in the step (3) is not limited to any particular one, provided that the void can be identified. The magnification of the SEM may be, for example, 3000 times to 7000 times.

The processes subsequent to the step (4) correspond to an image analysis process on the cross-sectional SEM image obtained in the step (3). The image analysis process can be carried out by, for example, causing a computer to read, by Python, data of the cross-sectional SEM image in the form of a JPEG file. The image analysis process can be carried out using a commercially available program capable of carrying out the processes of the above steps (4) through (12).

In a nonaqueous electrolyte secondary battery, pressure is applied in a direction perpendicular to a surface of a separator and a porous film that constitutes the separator, due to expansion of an electrode (e.g., a negative electrode). FIG. 2 is a schematic diagram illustrating (i) an aspect of a void 3 inside a polyolefin porous film 1 in which a polyolefin-based resin has a lower crystal orientation degree in the MD or the TD and (ii) an aspect of a void 3 inside a polyolefin porous film 2 in which a polyolefin-based resin has a higher crystal orientation degree in the MD or the TD. As illustrated in FIG. 2, a void 3 inside the polyolefin porous film 1 having a lower crystal orientation degree in the MD or the TD tends to have an aspect in which individual voids are separated. Meanwhile, a void 3 inside the polyolefin porous film 2 having a high crystal orientation degree in the MD or the TD tends to have an aspect in which a plurality of voids 3 overlap and are connected to one another. Here, voids in the aspect of overlapping and being connected to one another are treated, in the image analysis described above, as a single large void having a large inclination angle. Therefore, if there is an aspect in which a plurality of voids overlap and are connected to one another in the MD or TD inside the porous film, the average inclination angle is high.

As such, the feature of the separator in accordance with an embodiment of the present invention in which the average inclination angle is high, that is, not less than 7.0° reflects a fact that, inside the porous film, a plurality of voids in an aspect of overlapping and being connected to one another in the MD or the TD are generated. Therefore, in an embodiment of the present invention, inside the porous film, there are many voids in an aspect of being treated as a single large void as described above. The plurality of voids that function as a large void require larger pressure to be blocked and are thus more difficult to block when pressure is applied. Therefore, the separator in accordance with an embodiment of the present invention brings about, by including the porous film, an effect of satisfactorily maintaining ion permeability even when the separator is compressed.

In view of satisfactorily maintaining ion permeability when being compressed as described above, the average inclination angle is preferably not less than 8.0° and more preferably not less than 8.7°. The average inclination angle is preferably not more than 20° and more preferably not more than 15°. If the average inclination angle is not more than 20°, a short circuit can be satisfactorily prevented. A standard deviation of the inclination angle θ in all void parts is preferably 13.0 to 18.0, and more preferably 14.0 to 17.0.

In an embodiment of the present invention, both the average inclination angle in the MD and the average inclination angle in the TD are preferably not less than 7.0°, and more preferably within the preferable range described above. In such a case, the porous film includes therein many voids in the aspect of being treated as a single large void. Therefore, the separator in accordance with an embodiment of the present invention can more satisfactorily maintain ion permeability when being compressed. The "average inclination angle in the MD" means an average of the inclination angles each of which is calculated from a two-dimensional image of a cross section which is formed by cutting the polyolefin porous film (i) along a straight line that passes a center of a surface of the polyolefin porous film and is parallel to the MD and (ii) in a direction perpendicular to the surface. The "average inclination angle in the TD" means an average of the inclination angles each of which is calculated from a two-dimensional image of a cross section which is formed by cutting the polyolefin porous film (i) along a straight line that passes a center of a surface of the polyolefin porous film and is parallel to the TD and (ii) in a direction perpendicular to the surface. Hereinafter, the term "average inclination angle" simply refers to an average inclination angle in the MD or an average inclination angle in the TD.

In the entire porous film, an average area (unit: $\mu m^2$) of void parts extracted in the step (8) above is preferably 0.012 $\mu m^2$ to 0.03 $\mu m^2$, and more preferably 0.015 $\mu m^2$ to 0.025 $\mu m^2$, in view of more suitably maintaining ion permeability of the compressed porous film. A standard deviation of the area in all void parts is preferably 0.018 to 0.030 and more preferably 0.019 to 0.029.

In the entire porous film, an average Feret diameter (unit: μm) of the void parts is preferably 0.18 μm to 0.28 μm, and more preferably 0.2 μm to 0.25 μm, in view of more suitably maintaining ion permeability of the compressed porous film. A standard deviation of the Feret diameter in all void parts is preferably 0.120 to 0.200 and more preferably 0.140 to 0.190.

In the entire porous film, an average circle equivalent diameter (unit: μm) of the void parts is preferably 0.12 μm to 0.18 μm, and more preferably 0.11 μm to 0.16 μm, in view of more suitably maintaining ion permeability of the compressed porous film. A standard deviation of the circle equivalent diameter in all void parts is preferably 0.060 to 0.080 and more preferably 0.062 to 0.078.

In the entire porous film, an average degree of circularity (unit: none) of the void parts is preferably not less than 0.2, and more preferably not less than 0.3, in view of more suitably maintaining ion permeability of the compressed porous film. The average degree of circularity of the void parts is preferably not more than 0.4 and more preferably not more than 0.37. Note that, as the degree of circularity is closer to 1, a shape of the void is closer to a circle. A standard deviation of the degree of circularity in all void parts is preferably 0.0171 to 0.0190 and more preferably 0.0172 to 0.0189.

In the entire porous film, an average long-short ratio (L/S) between a length L (μm) of a long side of the circumscribed rectangle and a length S (μm) of a short side of the circumscribed rectangle is preferably not more than 5.0 and more preferably not more than 4.5, in view of more suitably maintaining ion permeability of the compressed porous film. Here, the long-short ratio is calculated from the circumscribed rectangle of the void part. The average long-short ratio is not less than 1.0, preferably not less than 2.0, and preferably not less than 3.5. A standard deviation of the long-short ratio in all void parts is preferably 1.9 to 2.8, and more preferably 2.0 to 2.7.

The averages and the standard deviations of the area, the Feret diameter, the circle equivalent diameter, the degree of circularity, and the long-short ratio in the void parts can be, for example, measured and calculated by methods described in Examples later.

The porous film contains a polyolefin-based resin. Typically, the porous film contains the polyolefin-based resin as a main component. Note that the phrase "contains a polyolefin-based resin as a main component" means that a porous film contains a polyolefin-based resin at a proportion of not less than 50% by volume, preferably not less than 90% by volume, and more preferably not less than 95% by volume, relative to the entire amount of materials of which the porous film is made.

The porous film has many pores connected to one another. This allows a gas and a liquid to pass through the porous film from one side to the other side. Note that the pore is identical to the void.

The porous film has a thickness of 4 μm to 40 μm. The thickness of the porous film is preferably 5 μm to 20 μm. The porous film having a film thickness of not less than 4 μm makes it possible to sufficiently prevent an internal short circuit in a battery. The porous film having a thickness of not more than 40 μm makes it possible to prevent the nonaqueous electrolyte secondary battery from being large in size.

The polyolefin-based resin more preferably contains a high molecular weight component having a weight-average molecular weight of $5\times10^5$ to $15\times10^6$. In particular, the polyolefin-based resin more preferably contains a high molecular weight component t having a weight-average molecular weight of not less than 1,000,000, because such a resin improves the strength of the porous film and the separator including the porous film.

The polyolefin-based resin is not limited to a particular one, and possible examples encompass thermoplastic resins such as homopolymers and copolymers which are each obtained by polymerizing a monomer(s) such as ethylene, propylene, 1-butene, 4-methyl-1-pentene, and/or 1-hexene. Examples of such homopolymers encompass polyethylene, polypropylene, and polybutene. Examples of such copolymers encompass an ethylene-propylene copolymer.

Among the above examples, polyethylene is more preferable because use of polyethylene makes it possible to prevent a flow of an excessively large electric current at a lower temperature in the separator. Preventing the flow of an excessively large electric current is also called "shutdown." Examples of the polyethylene encompass low-density polyethylene, high-density polyethylene, linear polyethylene (ethylene-α-olefin copolymer), and ultra-high molecular weight polyethylene having a weight-average molecular weight of not less than 1,000,000. Among these examples, the ultra-high molecular weight polyethylene having a weight-average molecular weight of not less than 1,000,000 is more preferable.

The polyolefin-based resin has a number-average number of branches of preferably not more than 0.5, and more preferably not more than 0.2. If the number-average number of branches of the polyolefin-based resin is within the above-described range, the crystal orientation degree of the polyolefin-based resin in the porous film in the MD and the TD is suitably improved. Here, as described later, if the crystal orientation degree in the MD and the TD is suitably improved, voids in the porous film are more likely to have an aspect of overlapping and being connected to one another. As a result, the average inclination angle is suitably improved. By the polyolefin-based resin having a number-average number of branches that is within the above range, it is possible to suitably improve the average inclination angle and control the average inclination angle to the above-described suitable range.

Herein, the number-average number of branches can be calculated from, for example, a conformation plot using GPC-MALS. Specifically, the number-average number of branches of the polyolefin-based resin can be measured and calculated by a method described in Examples later.

The porous film typically has a weight per unit area of preferably 4 $g/m^2$ to 20 $g/m^2$, and more preferably 5 $g/m^2$ to 12 $g/m^2$, so as to allow a battery to have a higher weight energy density and a higher volume energy density.

The porous film has an air permeability of preferably 110 sec/100 mL to 200 sec/100 mL, and more preferably 110 sec/100 mL to 190 sec/100 mL, in terms of Gurley values, because such an air permeability enables a sufficient ion permeability.

The porous film has a porosity of preferably 20% by volume to 80% by volume, and more preferably 30% by volume to 75% by volume, so as to (i) retain a larger amount of electrolyte and (ii) obtain the function of reliably preventing (shutting down) a flow of an excessively large electric current at a lower temperature.

In order for the porous film and the separator including the porous film to have more excellent ion permeability after being compressed, the porosity of the porous film is more preferably not less than 35% by volume, and particularly preferably not less than 50% by volume.

The pore diameter of each pore of the porous film is preferably not more than 0.3 μm and more preferably not more than 0.14 μm, in view of (i) achieving sufficient ion permeability and (ii) preventing particles which constitute an electrode from entering the porous film.

<Method of Producing Porous Film>

A method of producing a porous film in an embodiment of the present invention is not limited to a particular method, and specific examples encompass a method including the following steps (A) through (C):

(A) obtaining a polyolefin resin composition by melting and kneading, in a kneader, a polyolefin-based resin and optionally a pore forming agent;

(B) obtaining a primary sheet by stretching, while cooling, the obtained polyolefin resin composition in the MD to form a sheet; and (C) stretching the primary sheet in the TD.

In the step (A), the polyolefin-based resin is used in an amount of preferably 6% by weight to 45% by weight, and more preferably 9% by weight to 36% by weight, with respect to 100% by weight of the polyolefin resin composition to be obtained.

The pore forming agent is not limited to a particular one, and possible examples encompass plasticizers and inorganic bulking agents. The inorganic bulking agents are not limited to particular ones. Examples of the inorganic bulking agents encompass inorganic fillers (specifically, calcium carbonate and the like). The plasticizers are not limited to particular ones. Examples of the plasticizers encompass low molecular weight hydrocarbons such as liquid paraffin.

Examples of the additive encompass publicly known additives other than the pore forming agent, which additives can be optionally added to an extent that does not cause a deterioration in effects of the present invention. Examples of the publicly known additives encompass antioxidants, fillers, and dispersion auxiliary agents. Examples of the fillers encompass alumina.

In the step (B), the method of obtaining the primary sheet is not limited to a particular method. The primary sheet may be obtained by a sheet forming method such as inflation processing, calendering, T-die extrusion, or a Scaif method.

A sheet formation temperature in the sheet forming method, such as a T-die extrusion temperature in T-die extrusion, is preferably 200° C. to 280° C., and more preferably 220° C. to 260° C., for example.

A stretching temperature employed in the step (B) is preferably 120° C. to 160° C., and more preferably 130° C. to 155° C.

The method of cooling the polyolefin resin composition in the step (B) may be, for example, a method of bringing the polyolefin resin composition into contact with a cooling medium such as cool air or coolant water, or a method of bringing the polyolefin resin composition into contact with a cooling roller. The method of involving contact with a cooling roller is preferable.

If the polyolefin resin composition and the primary sheet contain a pore forming agent, the method of producing the polyolefin porous film includes a step of removing the pore forming agent by cleaning the sheet stretched in the step (B) or the sheet stretched in the step (C) with use of cleaning liquid. The step of removing the pore forming agent is performed between the steps (B) and (C), or after the step (C).

The cleaning liquid is not limited to a particular one, as long as it is a solvent capable of removing the pore forming agent. Examples of the cleaning liquid encompass an aqueous hydrochloric acid solution, heptane, and dichloromethane.

In the step (C), the stretching temperature employed when performing stretching in the TD is preferably 80° C. to 120° C., and more preferably 80° C. to 115° C.

The porous film may be obtained in a manner such that, in the step (C), the primary sheet that has been stretched in the TD is annealed by carrying out a heat treatment at a specific temperature. The annealing is carried out at a temperature of preferably 110° C. to 130° C., and more preferably 115° C. to 128° C. The annealing is carried out for a period of preferably not less than 15 seconds to less than 20 minutes, and more preferably not less than 1 minute to not more than 15 minutes.

In the method of producing a porous film, by adjusting reaction conditions appropriately, the average inclination angle in a porous film to be produced can be controlled to a suitable range of not less than 7.0. Examples of a method of controlling the average inclination angle to a suitable range of not less than 7.0 encompass a method of suitably improving a crystal orientation degree in the MD or the TD of a polyolefin-based resin in a porous film to be produced. Here, as described above, when the crystal orientation degree in the MD or the TD of the polyolefin-based resin in the porous film is high, there is a tendency that voids having an aspect of overlapping and being connected to one another are generated. The voids in the aspect of overlapping and being connected to one another are treated as a single large void having a large inclination angle. Therefore, by improving the crystal orientation degree in the MD or the TD, the average inclination angle can be controlled to a suitable range of not less than 7.0.

Examples of a specific method for suitably improving the crystal orientation degree in the MD of the polyolefin-based resin encompass a method for controlling the stretch ratio in the MD in the step (B) to a specific range. In view of suitably improving the crystal orientation degree in the MD, the stretching ratio in the MD is preferably a high ratio, specifically, preferably not less than 1.55 times, and more preferably not less than 1.8 times. In view of film formation stability, the stretch ratio in the MD is preferably not more than 2.5 times, and more preferably not more than 2.2 times. If the stretch ratio in the MD is within the above range, in particular, not less than 1.55 times, it is possible to suitably improve the crystal orientation degree of the polyolefin-based resin in the MD. As a result, the average inclination angle in the MD in a porous film to be produced can be controlled to a suitable range of not less than 7.0.

Examples of a specific method for suitably improving the crystal orientation degree in the TD of the polyolefin-based resin encompass a method for controlling the stretch ratio in the TD in the step (C) to a specific range. In view of suitably improving the crystal orientation degree in the TD, the stretching ratio in the TD is preferably a high ratio, specifically, preferably not less than 5 times, and more preferably not less than 7 times. In view of film formation stability, the stretch ratio in the TD is preferably not more than 12 times, and more preferably not more than 10 times. If the stretch ratio in the TD is within the above range, in particular, not less than 5 times, it is possible to suitably improve the crystal orientation degree of the polyolefin-based resin in the TD. As a result, the average inclination angle in the TD in a porous film to be produced can be controlled to a suitable range of not less than 7.0.

Therefore, by adjusting either the stretch ratio in the MD or the stretch ratio in the TD to fall within the preferable range described above, the average inclination angle can be improved and suitably controlled to fall within the above range. By adjusting both the stretch ratio in the MD and the stretch ratio in the TD to fall within the preferable range described above, both the average inclination angle in the MD and the average inclination angle in the TD can be improved and suitably controlled to fall within the above range.

The average inclination angle in a porous film to be produced can be more suitably improved and controlled to fall within a more suitable range by using a polyolefin-based resin as a raw material capable of achieving a high degree of crystal orientation, in addition to controlling the stretch ratio in the MD to fall within the above-described range, particularly to not less than 1.55 times, and/or controlling the stretch ratio in the TD to fall within the above-described range, particularly to not less than 5 times. Examples of the polyolefin-based resin capable of achieving a high degree of crystal orientation encompass a polyolefin-based resin that is less branched, specifically, a polyolefin-based resin in which the number-average number of branches is not more than 0.5. In particular, if the stretch ratio in the MD is a small ratio close to 1.55 times within the above-described range, it is preferable to use a polyolefin-based resin having a number-average number of branches of not more than 0.2, in view of preventing a failure to sufficiently improve the average inclination angle in the MD by only controlling the stretch ratio in the MD. Similarly, if the stretch ratio in the TD is a small ratio close to 5 times within the above-described range, it is preferable to use a polyolefin-based resin having a number-average number of branches of not more than 0.2, in view of preventing a failure to sufficiently improve the average inclination angle in the TD by only controlling the stretch ratio in the TD.

<Insulating Porous Layer>

If the separator in accordance with an embodiment of the present invention is a laminated separator, the laminated separator preferably includes the porous film and an insulating porous layer formed on the porous film.

The insulating porous layer is typically a resin layer containing a resin. The insulating porous layer is preferably a heat-resistant layer or an adhesive layer. It is preferable that the resin of which the insulating porous layer is made be insoluble in the electrolyte of the battery and be electrochemically stable when the battery is in normal use. Hereinafter, the insulating porous layer may also be referred to simply as a "porous layer".

The porous layer is formed on one surface or on both surfaces of the porous film, as necessary. If the porous layer is formed on one surface of the porous film, the porous layer is preferably formed on a surface of the porous film which surface faces a positive electrode of a nonaqueous electrolyte secondary battery to be produced, and more preferably on a surface of the porous film which surface comes into contact with the positive electrode.

It is preferable that the resin be insoluble in the electrolyte of the battery and, when the battery is in normal use, be electrochemically stable.

Specific examples of the resin encompass polyolefins, (meth)acrylate-based resins, fluorine-containing resins, polyamide-based resins, polyimide-based resins, polyester-based resins, rubbers, resins with a melting point or glass transition temperature of not lower than 180° C., water-soluble polymers, polycarbonate, polyacetal, and polyether ether ketone.

Of the above resins, polyolefins, (meth)acrylate-based resins, fluorine-containing resins, polyamide-based resins, polyester-based resins, and water-soluble polymers are preferable.

Preferable examples of the polyolefins include polyethylene, polypropylene, polybutene, and an ethylene-propylene copolymer.

Examples of the fluorine-containing resins include: polyvinylidene fluoride (PVDF), polytetrafluoroethylene, a vinylidene fluoride-hexafluoropropylene copolymer, a tetrafluoroethylene-hexafluoropropylene copolymer, a tetrafluoroethylene-perfluoroalkyl vinyl ether copolymer, a vinylidene fluoride-tetrafluoroethylene copolymer, a vinylidene fluoride-trifluoro ethylene copolymer, a vinylidene fluoride-trichloroethylene copolymer, a vinylidene fluoride-vinyl fluoride copolymer, a vinylidene fluoride-hexafluoropropylene-tetrafluoroethylene copolymer, and an ethylene-tetrafluoroethylene copolymer; and a fluorine-containing rubber having a glass transition temperature of not more than 23° C. among the fluorine-containing resins.

As the polyamide-based resins, aramid resins such as aromatic polyamides and wholly aromatic polyamides are preferable.

Specific examples of the aramid resins encompass poly(paraphenylene terephthalamide), poly(metaphenylene isophthalamide), poly(parabenzamide), poly(metabenzamide), poly(4,4'-benzanilide terephthalamide), poly(paraphenylene-4,4'-biphenylene dicarboxylic acid amide), poly(metaphenylene-4,4'-biphenylene dicarboxylic acid amide), poly(paraphenylene-2,6-naphthalene dicarboxylic acid amide), poly(metaphenylene-2,6-naphthalene dicarboxylic acid amide), poly(2-chloroparaphenylene terephthalamide), a paraphenylene terephthalamide/2,6-dichloroparaphenylene terephthalamide copolymer, and a metaphenylene terephthalamide/2,6-dichloroparaphenylene terephthalamide copolymer. Among these aramid resins, poly(paraphenylene terephthalamide) is more preferable.

The polyester-based resins are preferably aromatic polyesters such as polyarylates, and liquid crystal polyesters.

Examples of the rubbers include a styrene-butadiene copolymer and a hydride thereof, a methacrylate ester copolymer, an acrylonitrile-acrylic ester copolymer, a styrene-acrylic ester copolymer, ethylene propylene rubber, and polyvinyl acetate.

Examples of the resins each having a melting point or a glass transition temperature of not lower than 180° C. encompass polyphenylene ether, polysulfone, polyether sulfone, polyphenylene sulfide, polyetherimide, polyamide imide, and polyether amide.

Examples of the water-soluble polymers include polyvinyl alcohol, polyethylene glycol, cellulose ether, sodium alginate, polyacrylic acid, polyacrylamide, and polymethacrylic acid.

The porous layer may contain only one of the above resins or two or more of the above resins in combination.

The porous layer may contain fine particles. The term "fine particles" herein means organic fine particles or inorganic fine particles generally referred to as a filler. Therefore, if the porous layer contains fine particles, the above-described resin contained in the porous layer functions as a binder resin for (i) binding fine particles together and (ii) binding fine particles to the porous film. The fine particles are preferably electrically insulating fine particles.

Examples of the organic fine particles that can be contained in the porous layer encompass resin fine particles. Specific examples of the inorganic fine particles that can be contained in the porous layer encompass fillers made of inorganic matter such as calcium carbonate, talc, clay, kaolin, silica, hydrotalcite, diatomaceous earth, magnesium carbonate, barium carbonate, calcium sulfate, magnesium sulfate, barium sulfate, aluminum hydroxide, boehmite, magnesium hydroxide, calcium oxide, magnesium oxide, titanium oxide, titanium nitride, alumina (aluminum oxide), aluminum nitride, mica, zeolite, and glass. These inorganic fine particles are electrically insulating fine particles. It is possible to use only one type of the above fine particles, or two or more types of the above fine particles in combination.

Of the above fine particles, fine particles made of inorganic matter are suitable. More preferable are fine particles made of an inorganic oxide such as silica, calcium oxide, magnesium oxide, titanium oxide, alumina, mica, zeolite, aluminum hydroxide, or boehmite. Still more preferable are fine particles made of at least one selected from the group consisting of silica, magnesium oxide, titanium oxide, aluminum hydroxide, boehmite, and alumina. Particularly preferable are fine particles made of alumina.

The porous layer contains the fine particles in an amount of preferably 1% by volume to 99% by volume, and more preferably 5% by volume to 95% by volume, with respect to 100% by volume of the porous layer. Setting the amount of the fine particles to fall within the above range makes it less likely that the resin or the like will block a void which is formed when the fine particles come into contact with each other. This makes it possible to achieve sufficient ion permeability and an appropriate weight per unit area of the porous layer.

The porous layer can contain two or more kinds of fine particles in combination which two or more kinds differ from each other in particle size or specific surface area.

The porous layer has a thickness of preferably 0.5 μm to 15 μm per layer, and more preferably 2 μm to 10 μm per layer. Setting the thickness of the porous layer to be not less than 0.5 μm per layer makes it possible to sufficiently prevent an internal short circuit caused by, for example, breakage of the nonaqueous electrolyte secondary battery, and also to retain a sufficient amount of the electrolyte in the porous layer. Setting the thickness of the porous layer to be not more than 15 μm per layer makes it possible to reduce or prevent a decrease in a rate characteristic or cycle characteristic.

The weight per unit area of the porous layer is preferably 1 $g/m^2$ to 20 $g/m^2$ per layer and more preferably 4 $g/m^2$ to 10 $g/m^2$ per layer.

A volume per square meter of all component(s) contained in the porous layer is preferably 0.5 $cm^3$ to 20 $cm^3$ per layer, more preferably 1 $cm^3$ to 10 $cm^3$ per layer, and even more preferably 2 $cm^3$ to 7 $cm^3$ per layer.

For the purpose of achieving sufficient ion permeability, the porosity of the porous layer is preferably 20% by volume to 90% by volume, and more preferably 30% by volume to 80% by volume. In order for a laminated separator to have sufficient ion permeability, the pore diameter of each pore of the porous layer is preferably not more than 3 μm, and more preferably not more than 1 μm.

<Laminated Separator>

The separator in accordance with an embodiment of the present invention may be a laminated separator.

The laminated separator has a thickness of preferably 5.5 μm to 45 μm and more preferably 6 μm to 25 μm.

The laminated separator has an air permeability of preferably 100 sec/100 mL to 350 sec/100 mL and more preferably 100 sec/100 mL to 300 sec/100 mL, in terms of Gurley values.

The separator in accordance with an embodiment of the present invention may include, as necessary, another porous layer other than the porous film and the porous layer, provided that the other porous layer does not prevent attainment of an object of an embodiment of the present invention. Examples of the other porous layer encompass publicly known porous layers such as a heat-resistant layer, an adhesive layer, and a protective layer.

The other porous layer may be provided on one surface or on both surfaces of the laminated separator. If the laminated separator includes insulating porous layers on both surfaces of the porous film, the other porous layer may be provided on both the insulating porous layers or on one of the insulating porous layers. If the laminated separator includes an insulating porous layer only on one surface of the porous film, the other porous layer may be provided on the insulating porous layer or on the other surface of the porous film where the insulating porous layer is not provided. The other porous layer may be said to be provided on the outermost layer of the laminated separator.

For example, the laminated separator further includes an adhesive layer in addition to the insulating porous layer. Herein, the adhesive layer refers to a porous layer having adhesiveness. The adhesive layer can be provided on a surface of the laminated separator that comes into contact with an electrode. Examples of a component that contributes to the adhesiveness in the adhesive layer encompass an acrylic resin, PVDF, and the like.

<Method of Producing Porous Layer and Laminated Separator>

A method of producing the insulating porous layer in an embodiment of the present invention and the laminated separator in accordance with an embodiment of the present invention may be, for example, a method involving: applying a coating solution to one or both surfaces of the porous film, the coating solution containing the resin contained in the porous layer; and depositing the porous layer by drying the coating solution.

If the porous layer is to be deposited on both surfaces of the porous film, (a) the porous layer may be deposited on both surfaces of the porous film simultaneously, or (b) the coating solution may be applied to a first surface of the porous film and then dried so as to form a porous layer on the first surface, and then subsequently the coating solution may be applied to a second surface of the porous film and then dried so as to form a porous layer on the second surface.

Note that, before the coating solution is applied to one or both surfaces of the porous film, the one or both surfaces of the porous film to which the coating solution is to be applied can be subjected to a hydrophilization treatment as necessary.

The coating solution contains a resin to be contained in the porous layer. The coating solution may contain the below-described fine particles which may be contained in the porous layer. The coating solution can be prepared typically by (i) dissolving, in a solvent, the resin that can be contained in the porous layer and (ii) dispersing, in the solvent, the fine particles. The solvent in which the resin is to be dissolved also serves as a dispersion medium in which the fine particles are to be dispersed. Depending on the solvent, the resin may be an emulsion.

The solvent is not limited to any particular one, provided that (i) the solvent does not have an adverse effect on the porous film, (ii) the solvent allows the resin to be uniformly and stably dissolved in the solvent, and (iii) the solvent allows the fine particles to be uniformly and stably dispersed in the solvent. Specific examples of the solvent encompass water and organic solvents. It is possible to use only one of the above solvents or two or more of the above solvents in combination.

The coating solution may be formed by any method, provided that the coating solution can satisfy conditions, such as a resin solid content (resin concentration) and/or a fine particle amount, which are necessary for obtaining a desired porous layer. Specific examples of the method of forming the coating solution encompass a mechanical stirring method, an ultrasonic dispersion method, a high-pressure dispersion method, and a media dispersion method. Further, the coating solution may contain, as a component(s) other than the resin and the fine particles, an additive(s) such as a disperser, a plasticizer, a surfactant, and/or a pH adjustor, provided that the additive does not prevent attainment of an object of an embodiment of the present invention.

The additive(s) may be contained in an amount that does not prevent attainment of an object of an embodiment of the present invention.

A method of applying the coating solution to the porous film, that is, a method of forming a porous layer on a surface of the porous film is not limited to any particular one. The porous layer can be formed by, for example, (i) a method including the steps of applying the coating solution directly to a surface of the porous film and then removing the solvent, (ii) a method including the steps of applying the coating solution to an appropriate support, removing the solvent to form a porous layer, then pressure-bonding the porous layer to the porous film, and subsequently peeling the support off, and (iii) a method including the steps of applying the coating solution to a surface of an appropriate support, then pressure-bonding the porous film to that surface, then peeling the support off, and subsequently removing the solvent.

The coating solution can be applied by a conventionally publicly known method. Specific examples of such a method include a gravure coater method, a dip coater method, a bar coater method, and a die coater method.

The solvent is typically removed by a drying method. The solvent contained in the coating solution may be replaced with another solvent before a drying operation.

Embodiment 2: Nonaqueous Electrolyte Secondary Battery Member, Embodiment 3: Nonaqueous Electrolyte Secondary Battery A nonaqueous electrolyte secondary battery member in accordance with Embodiment 2 of the present invention includes a positive electrode, the nonaqueous electrolyte secondary battery separator in accordance with Embodiment 1 of the present invention, and a negative electrode, the positive electrode, the nonaqueous electrolyte secondary battery separator, and the negative electrode being arranged in this order.

A nonaqueous electrolyte secondary battery in accordance with Embodiment 3 of the present invention includes the nonaqueous electrolyte secondary battery separator in accordance with Embodiment 1 of the present invention.

A nonaqueous electrolyte secondary battery in accordance with Embodiment 3 of the present invention can be, for example, a nonaqueous secondary battery that achieves an electromotive force through doping with and dedoping of lithium, and can include a nonaqueous electrolyte secondary battery member including (i) a positive electrode, (ii) the separator in accordance with Embodiment 1 the present invention, and (iii) a negative electrode, the positive electrode, the separator, and the negative electrode being arranged in this order. Note that components of the nonaqueous electrolyte secondary battery other than the separator are not limited to those described below.

The nonaqueous electrolyte secondary battery in accordance with Embodiment 3 of the present invention is typically configured so that a battery element is enclosed in an exterior member, the battery element including (i) a structure in which the negative electrode and the positive electrode face each other and sandwich the separator in accordance with Embodiment 1 of the present invention and (ii) an electrolyte with which the structure is impregnated. The nonaqueous electrolyte secondary battery is particularly preferably a lithium-ion secondary battery. Note that the doping refers to occlusion, support, adsorption, or insertion, and refers to a phenomenon in which lithium ions enter an active material of an electrode (e.g., a positive electrode).

The nonaqueous electrolyte secondary battery member in accordance with Embodiment 2 of the present invention includes the separator in accordance with Embodiment 1 of the present invention. Therefore, the nonaqueous electrolyte secondary battery member brings about an effect of suppressing a deterioration in battery performance caused by internal pressure occurring when charge and discharge are repeated in the nonaqueous electrolyte secondary battery. The nonaqueous electrolyte secondary battery in accordance with Embodiment 3 of the present invention includes the separator in accordance with Embodiment 1 of the present invention. Therefore, the nonaqueous electrolyte secondary battery brings about an effect of suppressing a deterioration in battery performance caused by internal pressure occurring when charge and discharge are repeated.

<Positive Electrode>

The positive electrode included in (i) the nonaqueous electrolyte secondary battery member in accordance with an embodiment of the present invention and (ii) the nonaqueous electrolyte secondary battery in accordance with an embodiment of the present invention is not limited to a particular one, provided that the positive electrode is one that is typically used in a nonaqueous electrolyte secondary battery. Examples of the positive electrode encompass a positive electrode sheet having a structure in which an active material layer, containing a positive electrode active material and a binding agent, is formed on a current collector. The active material layer may further contain an electrically conductive agent.

Examples of the positive electrode active material encompass materials capable of being doped with and dedoped of lithium ions. Specific examples of the materials include lithium complex oxides each containing at least one transition metal such as V, Mn, Fe, Co, or Ni.

Examples of the electrically conductive agent encompass carbonaceous materials such as natural graphite, artificial graphite, cokes, carbon black, pyrolytic carbons, carbon fiber, and a fired product of an organic polymer compound. It is possible to use only one of the above electrically conductive agents, or two or more of the above electrically conductive agents in combination.

Examples of the binding agent encompass (i) fluorine-based resins such as polyvinylidene fluoride, (ii) acrylic resin, and (iii) styrene butadiene rubber. Note that the binding agent also serves as a thickener.

Examples of the positive electrode current collector encompass electric conductors such as Al, Ni, and stainless steel. Among these, Al is preferable because Al is easily processed into a thin film and is inexpensive.

Examples of a method for producing the positive electrode in sheet form encompass: a method in which a positive electrode active material, an electrically conductive agent, and a binding agent are pressure-molded on a positive electrode current collector; and a method in which (i) a positive electrode active agent, an electrically conductive agent, and a binding agent are formed into a paste with the use of a suitable organic solvent, (ii) then, a positive electrode current collector is coated with the paste, and (iii) subsequently, the paste is dried and then pressured so that the paste is firmly fixed to the positive electrode current collector.

<Negative Electrode>

The negative electrode included in (i) the nonaqueous electrolyte secondary battery member in accordance with an embodiment of the present invention and (ii) the nonaqueous electrolyte secondary battery in accordance with an embodiment of the present invention is not limited to a particular one, provided that the negative electrode is one that is typically used in a nonaqueous electrolyte secondary battery. Examples of the negative electrode encompass a negative electrode sheet having a structure in which an active material layer, containing a negative electrode active material and a binding agent, is formed on a current collector. The active material layer may further contain an electrically conductive agent.

Examples of the negative electrode active material encompass (i) materials capable of being doped with and dedoped of lithium ions, (ii) a lithium metal, and (iii) a lithium alloy. Examples of the materials capable of being doped with and dedoped of lithium ions encompass carbonaceous materials. Examples of carbonaceous materials encompass natural graphite, artificial graphite, cokes, carbon black, and pyrolytic carbons.

Examples of the negative electrode current collector include Cu, Ni, and stainless steel. Among these, Cu is more preferable because Cu is not easily alloyed with lithium especially in a lithium-ion secondary battery and is easily processed into a thin film.

Examples of a method for producing the negative electrode in sheet form encompass: a method in which a negative electrode active material is pressure-molded on a negative electrode current collector; and a method in which (i) a negative electrode active material is formed into a paste with the use of a suitable organic solvent, (ii) then, a negative electrode current collector is coated with the paste, and (iii) subsequently, the paste is dried and then pressured so that the paste is firmly fixed to the negative electrode current collector. The paste preferably contains the electrically conductive agent and the binding agent.

<Nonaqueous Electrolyte>

A nonaqueous electrolyte in a nonaqueous electrolyte secondary battery in accordance with an embodiment of the present invention is not limited to any particular one, provided that the nonaqueous electrolyte is one that is generally used for a nonaqueous electrolyte secondary battery. The nonaqueous electrolyte can be one prepared by, for example, dissolving a lithium salt in an organic solvent. Examples of the lithium salt encompass $LiClO_4$, $LiPF_6$, $LiAsF_6$, $LiSbF_6$, $LiBF_4$, $LiCF_3$, $SO_3$, LIN $(CF_3SO_2)_2$, $LiC(CF_3SO_2)_3$, $Li_2B_{10}Cl_{10}$, lower aliphatic carboxylic acid lithium salt, and $LiAlCl_4$. It is possible to use only one of the above lithium salts or two or more of the above lithium salts in combination.

Examples of the organic solvent to be contained in the nonaqueous electrolyte encompass carbonates, ethers, esters, nitriles, amides, carbamates, and sulfur-containing compounds, and fluorine-containing organic solvents each obtained by introducing a fluorine group into any of these organic solvents. It is possible to use only one of the above organic solvents or two or more of the above organic solvents in combination.

Aspects of the present invention can also be expressed as follows:

An embodiment of the present invention may include the features described in the following <1> through <7>.

<1> A nonaqueous electrolyte secondary battery separator including a polyolefin porous film, an average of inclination angles of major axes of voids extracted from a two-dimensional image of a cross section of the polyolefin porous film being not less than 7.0, the inclination angles being calculated from respective circumscribed rectangles of the voids, the two-dimensional image being obtained by use of a scanning electron microscope, and the cross section being formed by cutting the polyolefin porous film (i) along a straight line that passes a center of a surface of the polyolefin porous film and is parallel to an MD or a TD and (ii) in a direction perpendicular to the surface.

<2> The nonaqueous electrolyte secondary battery separator according to <1>, further including: an insulating porous layer containing a resin.

<3> The nonaqueous electrolyte secondary battery separator according to <2>, in which: the resin is one or more types of resin selected from the group consisting of polyolefins, (meth)acrylate-based resins, fluorine-containing resins, polyamide-based resins, polyester-based resins, and water-soluble polymers.

<4> The nonaqueous electrolyte secondary battery separator according to <2> or <3>, in which the resin is an aramid resin.

<5> The nonaqueous electrolyte secondary battery separator according to any one of <2> through <4>, further including an adhesive layer in addition to the insulating porous layer.

<6> A nonaqueous electrolyte secondary battery member including: a positive electrode; the nonaqueous electrolyte secondary battery separator according to any one of <1> through <5>; and a negative electrode, the positive electrode, the nonaqueous electrolyte secondary battery separator, and the negative electrode being arranged in this order.

<7> A nonaqueous electrolyte secondary battery including: the nonaqueous electrolyte secondary battery separator according to any one of <1> through <5>.

Note that the scope of the nonaqueous electrolyte secondary battery separator, the nonaqueous electrolyte secondary battery member, and the nonaqueous electrolyte secondary battery in accordance with an embodiment of the present invention can encompass any combination of matters described in the foregoing features within the scope of the claims.

EXAMPLES

The following description will discuss embodiments of the present invention in greater detail with reference to Examples and Comparative Examples. Note, however, that the present invention is not limited to the following Examples and Comparative Examples below.

[Measurement Methods]

The methods described below were used to measure physical properties and the like of separators produced in Examples 1 to 3 and in Comparative Examples 1 and 2.

(Thickness of Film)

The thickness of the separator was measured with the use of a high-precision digital measuring device (VL-50) manufactured by Mitutoyo Corporation.

(Porosity)

(a) Measurement of Thickness

The thickness of the separator was measured by the method described in the above-described section (Thickness of film).

(b) Measurement of Weight Per Unit Area

From the separator, a square piece measuring 8 cm×8 cm was cut out as a sample, and a weight W (g) of the sample was measured. The following Formula (1) was then used to calculate a weight per unit area of the separator.

$$\text{Weight per unit area (g/m}^2\text{)} = W/(0.08\times 0.08) \quad (1)$$

(c) Measurement of Real Density

The separator was cut into a piece measuring 4 mm to 6 mm square, and the piece of the separator was vacuum-dried at not more than 30° C. for 17 hours. After that, a real density of the separator was measured by a helium gas replacement method by use of a dry automatic densimeter (AccuPye II 1340 manufactured by Micromeritics Instrument Corporation).

(d) Calculation of Porosity

From the thicknesses [μm], the weight per unit area [g/m$^2$], and the real density [g/m$^3$] each calculated and measured in the processes described in (a) through (c) above, a porosity [%] of the separator was calculated based on Formula (2) below:

$$(\text{Porosity}) = \left[\frac{1-(\text{weight per unit area})/}{\{(\text{thickness})\times 10^{-6}\times 1[\text{m}^2]\times(\text{real density})\}}\right]\times 100 \quad (2)$$

(Various Parameters Representing Void Shape)

<Obtainment of Cross-Sectional SEM Images>

Through a procedure including steps (i) through (iii) below, a cross section of the separator was observed using SEM.

(i) For the separator, an ion milling method was carried out with the use of a cross-sectional sample preparation device (IB-19520) manufactured by JEOL Ltd., and the separator was cut to form a cross section. The cross section was a cross section obtained by cutting the separator along a straight line that passes through a center of the separator and is parallel to the MD and in a direction perpendicular to the surface.

(ii) Osmium deposition was carried out on the cross section formed in the step (i), and thus a deposited film was formed on the cross section.

(iii) For the cross section in which the deposited film had been formed in the step (ii), a reflection electron image was observed at a magnification of 5000 times with use of a scanning electron microscope (S-4800, manufactured by Hitachi High-Technologies Corporation). Thus, an SEM image of the cross section (thickness direction: 960 pixels×MD: 1280 pixels) was obtained. The observation conditions at that time were as follows: an acceleration voltage of 0.8 kV and an operating distance of 3.0 mm.

<Calculation of Various Parameters>

Through a procedure including steps 1 through 17 below, image analysis of a cross-sectional SEM image was carried out, and parameters (average area, average Feret diameter, average circle equivalent diameter, average degree of circularity, average long-short ratio (L/S), and average inclination angle θ) of the void shape were calculated.

1. By Python, a file (JPEG file) of image data of the cross-sectional SEM image was read.
2. From the image data read in the step 1, an analysis region having a size of 100 pixels (thickness direction)×1280 pixels (MD) was extracted. At that time, the analysis region was extracted so that the analysis region included the entire cross-sectional region of the separator (porous film). In the analysis region, the x-coordinate (x-axis) was taken in the MD and the y-coordinate (y-axis) was taken in the thickness direction.
3. With respect to the analysis region extracted in the step 2, a process of normalizing a luminance value was carried out.
4. In order to accurately identify a void part when carrying out binarization, a luminance inversion process was carried out with respect to the analysis region which had been subjected to the luminance value normalization process in the step 3.
5. Normalization was carried out, under a condition of a threshold of 180, with respect to the analysis region subjected to the luminance inversion process in the step 4, and then the normalized analysis region was binarized.
6. With respect to the analysis region which had been binarized in the step 5, a blob process was carried out, and thus a void part was identified.
7. An area of each blob, i.e., each void part identified in the step 6 was calculated from the number of pixels. Note that, in the analysis region of this Example, 1 pixel corresponds to 394 μm$^2$.
8. Among the identified void parts, a void part constituted by a blob having an area of not less than 10 pixels was extracted. In the subsequent processes, the extracted void part was treated as a void part, and a void part which was constituted by a blob having an area of smaller than 10 pixels was not treated as a void part.
9. For each of the void parts extracted in the step 8, as illustrated in FIG. 1, values of an extent (Dfx) in the x direction and an extent (Dfy) in the y direction were measured. Subsequently, a weighted average of Dfx and Dfy in each void part was calculated, and the calculated value was considered as a Feret diameter of each void part.
10. An area of each void part was calculated, and the value was considered to be a value A. For each void part, the calculated value A was used to calculate a value expressed in $(4\times A/\pi)^{1/2}$, and the calculated value was considered to be a circle equivalent diameter of each void part.
11. A circumference of each void part was calculated, and the value was considered to be a value 1. For each void part, the calculated value 1 and the area A of each void part were used to calculate a value expressed in $4\pi\times A/1^2$, and the calculated value was considered to be a degree of circularity of each void part.
12. For each void part, a circumscribed rectangle as illustrated in FIG. 1 was created. The circumscribed rectangle had a long side, a short side, and an inclination angle as parameters.
13. For each of the circumscribed rectangles created in the step 12, among the 4 vertices of the circumscribed rectangle, a vertex having the smallest x-coordinate was considered to be P1, and the other vertices were considered to be P2, P3, and P4 in the counterclockwise direction from P1.
14. For each of the circumscribed rectangles, a straight line that connects P1 to P2 was considered to be L12, and a straight line that connects P1 to P4 was considered to be L14.
15. For each of the circumscribed rectangles, a longer one of the straight lines L12 and L14 was considered to be a major axis, and a shorter one was considered to be a minor axis. Next, a length (L) of the major axis and a length(S) of the minor axis were measured. The values of L and S measured were used to calculate a long-short ratio (L/S) of each void part.
16. For each of the circumscribed rectangles, an angle formed between the major axis and the x-axis was calculated, and the calculated value was considered as an inclination angle θ of each void part. At that time, calculation was carried out with the following condition: 0°<θ<90°.

17. Averages of the respective parameters (i.e., area, Feret diameter, circle equivalent diameter, degree of circularity, long-short ratio (L/S), and inclination angle θ of each void part) calculated in the above steps were calculated for all void parts. Moreover, standard deviations of the respective parameters were calculated from the values of area, Feret diameter, circle equivalent diameter, degree of circularity, long-short ratio (L/S), and inclination angle θ of each void part.

(Difference Between Air Permeability/Thickness Before 60 MPa Compression and Air Permeability/Thickness after 60 MPa Compression)

Through a method including steps 1 through 5 below, a difference between air permeability/thickness before 60 MPa compression and air permeability/thickness after 60 MPa compression of the separator was measured.

Step 1: From the separator, a square piece measuring 6 cm×6 cm was cut out as a sample.

Step 2: The sample cut out in the step 1 was subjected to air permeability measurement in conformance with JIS P8117. The measured air permeability was considered to be air permeability ($AP_1$, unit: sec/100 mL) of the separator which is not compressed. A thickness of the separator was measured with the use of a high-precision digital measuring device (VL-50) manufactured by Mitutoyo Corporation. The measured thickness was considered to be a thickness ($t_1$, unit: μm) of the separator which is not compressed.

Step 3: The sample cut out in the step 1 was sandwiched with aluminum plates, and was then pressed with a hydraulic compression molding machine (NF-50, manufactured by Shinto Metal Industries, Ltd.). The pressing conditions were 60 MPa, 35° C., and 5 minutes.

Step 4: Measurement of air permeability and thickness was carried out in a manner similar to that in the step 2 also on the sample pressed in the step 3. The measured air permeability and the measured thickness were considered to be air permeability ($AP_2$, unit: sec/100 mL) of the separator after compression, and a thickness ($t_2$, unit: μm) of the separator after compression, respectively.

Step 5: The difference between air permeability/thickness before 60 MPa compression and air permeability/thickness after 60 MPa compression of the separator was calculated based the following Formula (3) using $AP_1$, $AP_2$, $t_1$, and $t_2$ obtained in the steps 2 and 4.

$$\left(\begin{array}{r}\text{Difference between air permeability/} \\ \text{thickness before 60 MPa compression and air permeability/} \\ \text{thickness after 60 MPa compression}\end{array}\right) \text{(unit: sec/100 mL/μm)} = \{(AP_2)/(t_2)\} - \{(AP_1)/(t_1)\} \quad (3)$$

(Number-Average Number of Branches)

The number-average number of branches of polyethylene, which is a polyolefin-based resin used in Examples and Comparative Examples, was calculated by a method including the following steps 1 through 4.

Step 1: A standard sample was prepared that was constituted by linear polyolefin which had no branches and was of a type identical with polyolefin constituting the above-described polyolefin-based resin.

Step 2: For the standard sample prepared in the step 1, a conformation plot based on GPC-MALS was prepared using DAWN HELEOS II.

Step 3: For the polyolefin-based resin, a conformation plot based on GPC-MALS was prepared in a manner similar to that in the step 2.

Step 4: From the conformation plot prepared in the step 2 and the conformation plot prepared in the step 3, the number-average number of branches of the polyolefin-based resin was calculated based on the following formula.

$$g = \frac{R_{gb}^2}{R_{gL}^2}$$

$$g = \left[\left(1 + \frac{B_n}{7}\right)^{\frac{1}{2}} + \frac{4B_n}{9\pi}\right]^{-\frac{1}{2}}$$

(where $R_{gL}$ is a radius of gyration of a linear polyolefin-based resin, $R_{gb}$ is a radius of gyration of a polyolefin-based resin having a branched structure, g is a value of $(R_{gL}/R_{gb})^2$ with an equivalent molecular weight, and $B_n$ is the number of branches in a single molecular chain).

Example 1

First, prepared was a mixture containing: 27.4 parts by weight of an ultra-high molecular weight polyethylene powder (intrinsic viscosity: 21 dL/g; viscosity average molecular weight: 3,000,000; number-average number of branches: 0.1; manufactured by Tosoh Corporation); 6.9 parts by weight of a polyethylene wax having a weight-average molecular weight of 4000 (EXCEREX 40800, manufactured by Mitsui Chemicals, Inc.), and 3.0 parts by weight of alumina (product name: AEROXIDE Alu65, manufactured by Nippon Aerosil Co., Ltd.). Then, 0.3 parts by weight of an antioxidant (IRGANOX 1010, manufactured by BASF), 0.1 parts by weight of an antioxidant (IRGAFOS 168, manufactured by BASF), 0.4 parts by weight of sodium stearate, and 0.6 parts by weight of a dispersion auxiliary agent (BYK-MAX P4102, manufactured by BYK) were added to 100 parts by weight of the mixture of (i) the ultra-high molecular weight polyethylene, (ii) the polyethylene wax, and (iii) the alumina so as to obtain a second mixture. Then, calcium carbonate having an average particle diameter of 0.07 μm (manufactured by Maruo Calcium Co., Ltd.) was added to the second mixture such that the volume of the calcium carbonate was 38% by volume with respect to the entire volume of a resultant mixture. The resultant mixture in the form of powder was mixed with a Henschel mixer, and was then melted and kneaded in a twin screw kneading extruder. In this way, a polyolefin resin composition was obtained. The polyolefin resin composition was extruded by a single screw extruder to obtain a resin sheet. A pair of heated rollers was used to stretch the resin sheet in the MD at a stretch ratio of 2.07 times, so that a polyolefin resin composition in sheet form was obtained. The polyolefin resin composition in sheet form thus obtained was immersed in an aqueous hydrochloric acid solution (containing 4 mol/L of hydrochloric acid and 0.5% by weight of a nonionic surfactant) to remove the calcium carbonate, so that a primary sheet was obtained. Next, TD-wise ends of the primary sheet thus obtained were each held by a plurality of holding members that were arranged so as to be adjacent in the MD. Next, the primary sheet was stretched in the TD at a stretch ratio of 7.05 times, so that a porous film 1 was obtained. The porous film 1 thus obtained was considered to be a separator 1.

Example 2

First, prepared was a mixture containing: 70 parts by weight of an ultra-high molecular weight polyethylene powder (GUR4032; number-average number of branches: 0.5; manufactured by Ticona); and 30 parts by weight of a polyethylene wax having a weight-average molecular weight of 1000 (FNP-0115, manufactured by Nippon Seiro Co., Ltd.). Then, 0.4 parts by weight of an antioxidant (IRGANOX 1010, manufactured by BASF), 0.1 parts by weight of an antioxidant (IRGAFOS 168, manufactured by BASF), and 1.3 parts by weight of sodium stearate were added to 100 parts by weight of the mixture of (i) the ultra-high molecular weight polyethylene and (ii) the polyethylene wax so as to obtain a second mixture. Then, calcium carbonate having an average particle diameter of 0.1 μm (manufactured by Maruo Calcium Co., Ltd.) was added to the second mixture such that the volume of the calcium carbonate was 38% by volume with respect to the entire volume of a resultant mixture. The resultant mixture in the form of powder was mixed with a Henschel mixer, and was then melted and kneaded in a twin screw kneading extruder. In this way, a polyolefin resin composition was obtained. The polyolefin resin composition was extruded by a single screw extruder to obtain a resin sheet. A pair of heated rollers was used to stretch the resin sheet in the MD at a stretch ratio of 2.04 times, so that a polyolefin resin composition in sheet form was obtained. The polyolefin resin composition in sheet form thus obtained was immersed in an aqueous hydrochloric acid solution (containing 4 mol/L of hydrochloric acid and 0.5% by weight of a nonionic surfactant) to remove the calcium carbonate, so that a primary sheet was obtained. Next, TD-wise ends of the primary sheet thus obtained were each held by a plurality of holding members that were arranged so as to be adjacent in the MD. Next, the primary sheet was stretched in the TD at a stretch ratio of 7.05 times, so that a porous film 2 was obtained. The porous film 2 thus obtained was considered to be a separator 2.

Example 3

First, prepared was a mixture containing: 27.4 parts by weight of an ultra-high molecular weight polyethylene powder (intrinsic viscosity: 21 dL/g; viscosity average molecular weight: 1,500,000; number-average number of branches: 0.1; manufactured by Tosoh Corporation); and 6.9 parts by weight of a polyethylene wax having a weight-average molecular weight of 4000 (EXCEREX 40800, manufactured by Mitsui Chemicals, Inc.). Then, 0.3 parts by weight of an antioxidant (IRGANOX 1010, manufactured by BASF), 0.1 parts by weight of an antioxidant (IRGAFOS 168, manufactured by BASF), and 0.4 parts by weight of sodium stearate were added to 100 parts by weight of the mixture of (i) the ultra-high molecular weight polyethylene and (ii) the polyethylene wax so as to obtain a second mixture. Then, calcium carbonate having an average particle diameter of 0.07 μm (manufactured by Maruo Calcium Co., Ltd.) was added to the second mixture such that the volume of the calcium carbonate was 38% by volume with respect to the entire volume of a resultant mixture. The resultant mixture in the form of powder was mixed with a Henschel mixer, and was then melted and kneaded in a twin screw kneading extruder. In this way, a polyolefin resin composition was obtained. The polyolefin resin composition was extruded by a single screw extruder to obtain a resin sheet. A pair of heated rollers was used to stretch the resin sheet in the MD at a stretch ratio of 1.56 times, so that a polyolefin resin composition in sheet form was obtained. The polyolefin resin composition in sheet form thus obtained was immersed in an aqueous hydrochloric acid solution (containing 4 mol/L of hydrochloric acid and 0.5% by weight of a nonionic surfactant) to remove the calcium carbonate, so that a primary sheet was obtained. Next, TD-wise ends of the primary sheet thus obtained were each held by a plurality of holding members that were arranged so as to be adjacent in the MD. Next, the primary sheet was stretched in the TD at a stretch ratio of 7.05 times, so that a porous film 3 was obtained. The porous film 3 thus obtained was considered to be a separator 3.

Comparative Example 1

A porous film C1 was obtained by carrying out an operation identical with that in Example 2, except that a stretch ratio in obtaining a polyolefin resin composition in sheet form by stretching the resin sheet in the MD was changed to 1.49 times. The porous film C1 thus obtained was considered to be a separator C1.

Comparative Example 2

A commercially available porous film (#2400, manufactured by Celgard, LLC) was used as a separator C2.

[Results]

Tables 1 through 3 below indicate results of measuring, by the methods described above, physical properties of the separators 1 through 3 and the separators C1 and C2 obtained in Examples 1 through 3 and in Comparative Examples 1 and 2.

TABLE 1

| | Porosity [% by volume] | Average Inclination angle [°] | Difference between air permeability/thickness before 60 MPa compression and air permeability/thickness after 60 MPa compression [sec/100 mL/μm] |
|---|---|---|---|
| Example 1 | 73 | 8.389 | 73.96 |
| Example 2 | 36 | 8.430 | 69.74 |
| Example 3 | 42 | 8.988 | 34.74 |
| Comparative Example 1 | 62 | 6.635 | 160.93 |
| Comparative Example 2 | 52 | 1.072 | 212.07 |

TABLE 2

| | Average area of void part [μm²] | Average degree of circularity of void part [—] | Average circle equivalent diameter of void part [μm] | Average Feret diameter of void part [μm] | Average long-short ratio of void part |
|---|---|---|---|---|---|
| Example 1 | 0.015 | 0.307 | 0.119 | 0.226 | 4.334 |
| Example 2 | 0.013 | 0.360 | 0.113 | 0.205 | 4.021 |
| Example 3 | 0.023 | 0.318 | 0.153 | 0.274 | 3.613 |
| Comparative Example 1 | 0.018 | 0.291 | 0.127 | 0.251 | 4.676 |
| Comparative Example 2 | 0.010 | 0.102 | 0.102 | 0.225 | 10.60 |

TABLE 3

| | Standard deviation of inclination angle | Standard deviation of area of void part | Standard deviation of degree of circularity of void part | Standard deviation of circle equivalent diameter of void part | Standard deviation of Feret diameter of void part | Standard deviation of long-short ratio of void part |
|---|---|---|---|---|---|---|
| Example 1 | 16.207 | 0.022 | 0.180 | 0.070 | 0.157 | 2.604 |
| Example 2 | 16.904 | 0.020 | 0.180 | 0.066 | 0.158 | 2.545 |
| Example 3 | 15.855 | 0.028 | 0.172 | 0.077 | 0.177 | 2.004 |
| Comparative Example 1 | 12.841 | 0.035 | 0.170 | 0.085 | 0.212 | 2.885 |
| Comparative Example 2 | 4.333 | 0.014 | 0.106 | 0.051 | 0.105 | 5.559 |

As indicated in Table 1, the separators 1 through 3 according to Examples 1 through 3 each included the porous film in which the average inclination angle was not less than 7.0. Therefore, the separators 1 through 3 fall under the separator in accordance with an embodiment of the present invention. In contrast, the separators C1 and C2 according to Comparative Examples 1 and 2 each included the porous film in which the average inclination angle was less than 7.0. Therefore, the separators C1 and C2 do not fall under the separator in accordance with an embodiment of the present invention. The difference between air permeability/thickness before 60 MPa compression and air permeability/thickness after 60 MPa compression is smaller in the separators 1 through 3 than in the separators C1 and C2, and a degree of increase in air permeability, i.e., a degree of decrease in ion permeability caused by the compression is smaller in the separators 1 through 3. Therefore, it has been found that the separator in accordance with an embodiment of the present invention can satisfactorily maintain ion permeability even when the separator is compressed.

As shown in Tables 1 through 3, the separators 1 through 3 exhibit the averages and standard deviations of the parameters (i.e., area, Feret diameter, circle equivalent diameter, degree of circularity, and long-short ratio of the void part) falling within the preferable ranges indicated in the section (Description of Embodiments) above. In contrast, the separators C1 and C2 exhibit the averages and standard deviations of the parameters that fall outside the preferable ranges described above. It is thus indicated that the separators 1 through 3 can more satisfactorily maintain ion permeability as compared with the separators C1 and C2, even when being compressed. It has been thus found that the separator in accordance with an embodiment of the present invention exhibits the averages and standard deviations of the parameters falling within the above-described preferable ranges, and can thereby more satisfactorily maintain ion permeability even when being compressed.

INDUSTRIAL APPLICABILITY

The separator in accordance with an embodiment of the present invention can satisfactorily maintain ion permeability even when the separator is compressed. Therefore, the separator in accordance with an embodiment of the present invention can be utilized as a separator for a high-capacity nonaqueous electrolyte secondary battery having a high internal pressure.

REFERENCE SIGNS LIST

1: Polyolefin porous film having lower crystal orientation degree in MD or TD of polyolefin-based resin
2: Polyolefin porous film having higher crystal orientation degree in MD or TD of polyolefin-based resin
3: Void

The invention claimed is:

1. A nonaqueous electrolyte secondary battery separator comprising a polyolefin porous film, an average of inclination angles of major axes of voids extracted from a two-dimensional image of a cross section of the polyolefin porous film being not less than 7.0°, the inclination angles being calculated from respective circumscribed rectangles of the voids, the two-dimensional image being obtained by use of a scanning electron microscope, and the cross section being formed by cutting the polyolefin porous film (i) along a straight line that passes a center of a surface of the polyolefin porous film and is parallel to an MD or a TD and (ii) in a direction perpendicular to the surface.

2. The nonaqueous electrolyte secondary battery separator, according to claim 1, further comprising:

an insulating porous layer containing a resin.

3. The nonaqueous electrolyte secondary battery separator according to claim 2, wherein: the resin is one or more types of resin selected from a group consisting of polyolefins, (meth)acrylate-based resins, fluorine-containing resins, polyamide-based resins, polyester-based resins, and water-soluble polymers.

4. The nonaqueous electrolyte secondary battery separator according to claim 2, wherein the resin is an aramid resin.

5. The nonaqueous electrolyte secondary battery separator according to claim 2, further comprising an adhesive layer in addition to the insulating porous layer.

6. A nonaqueous electrolyte secondary battery member comprising:

a positive electrode;

a nonaqueous electrolyte secondary battery separator according to claim 1; and a negative electrode, the positive electrode, the nonaqueous electrolyte secondary battery separator, and the negative electrode being arranged in this order.

7. A nonaqueous electrolyte secondary battery comprising: the nonaqueous electrolyte secondary battery separator according to claim 1.

* * * * *